United States Patent
Mandal et al.

(10) Patent No.: US 10,280,733 B2
(45) Date of Patent: May 7, 2019

(54) METHODS FOR EVALUATING CEMENT BONDING

(71) Applicant: Halliburton Energy Services, Inc., Houston, TX (US)

(72) Inventors: Batakrishna Mandal, Missouri City, TX (US); Srinivasan Jagannathan, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 226 days.

(21) Appl. No.: 15/318,105

(22) PCT Filed: Apr. 28, 2016

(86) PCT No.: PCT/US2016/029712
§ 371 (c)(1),
(2) Date: Dec. 12, 2016

(87) PCT Pub. No.: WO2016/191023
PCT Pub. Date: Dec. 1, 2016

(65) Prior Publication Data
US 2017/0114627 A1    Apr. 27, 2017

Related U.S. Application Data

(60) Provisional application No. 62/165,742, filed on May 22, 2015.

(51) Int. Cl.
*G01V 1/00* (2006.01)
*E21B 47/00* (2012.01)
(Continued)

(52) U.S. Cl.
CPC .......... *E21B 47/0005* (2013.01); *G01V 1/306* (2013.01); *G01V 1/50* (2013.01); *E21B 33/14* (2013.01); *G01V 1/52* (2013.01)

(58) Field of Classification Search
CPC combination set(s) only.
See application file for complete search history.

(56) References Cited

U.S. PATENT DOCUMENTS

| 5,664,550 A | 7/1997 | Priest |
| 5,995,447 A | 11/1999 | Mandal et al. |

(Continued)

FOREIGN PATENT DOCUMENTS

WO    2014/193382 A1    12/2014

OTHER PUBLICATIONS

Mandal, Batakrishna, and Alberto Quintero. "A new monocable circumferential acoustic scanner tool (CAST-M) for cased-hole and openhole applications." SPWLA 51st Annual Logging Symposium. Society of Petrophysicists and Well-Log Analysts, 2010.

(Continued)

*Primary Examiner* — Hovhannes Baghdasaryan
(74) *Attorney, Agent, or Firm* — Benjamin Fite; Baker Botts L.L.P.

(57) ABSTRACT

Methods for evaluating cement bonding in a wellbore are provided. An example method for determining cement impedance includes generating one or more acoustic signals within a wellbore comprising a borehole fluid, a casing, and a cement layer. One or more reflections of the acoustic signals may be received from at least a portion of the wellbore, wherein each of the one or more reflections comprises an initial reflection portion and a resonance portion. At least one of the initial reflection portion and the resonance portion may be modified based, at least in part, on an attenuation response of the borehole fluid. An impedance of the cement layer may be determined by analyzing at least one of the modified initial reflection portion and the modified resonance portion.

20 Claims, 5 Drawing Sheets

(51) Int. Cl.
*G01V 1/30* (2006.01)
*G01V 1/50* (2006.01)
*E21B 33/14* (2006.01)
*G01V 1/52* (2006.01)

(56) References Cited

U.S. PATENT DOCUMENTS 6,018,496 A   1/2000   Stanke et al.
6,041,861 A   3/2000   Mandal et al.
8,339,276 B2  12/2012  Mandal et al.

OTHER PUBLICATIONS

International Search Report and Written Opinion issued in related PCT Application No. PCT/US2016/029712 dated Aug. 24, 2016, 12 pages.
International Preliminary Report on Patentability issued in related PCT Application No. PCT/US2016/029712, dated Dec. 7, 2017, 9 pages.

METHODS FOR EVALUATING CEMENT BONDING

CROSS-REFERENCE TO RELATED APPLICATION

The present application is a U.S. National Stage Application of International Application No. PCT/US2016/029712 filed Apr. 28, 2016, which claims benefit of U.S. Provisional Application No. 62/165,742 filed May 22, 2015, both of which are incorporated herein by reference in their entirety for all purposes.

The present disclosure relates generally to evaluating cement bonding in a wellbore. Well drilling and completion operations typically require the use of casings within a wellbore in a subterranean formation to ensure that the wellbore does not collapse once it is drilled and that sensitive areas of the formation are protected and isolated. In most cases the casings are secured in the wellbore using a cement layer that fills an annulus between and bonds to both the casing and the formation. The strength of both cement bonds are important to the integrity of the well. Measuring cement impedance can provide information about the strength of the cement bonds.

Some casing and cement evaluation tools transmit an acoustic pulse into the casing and cement layer, and receive an echo signal of that pulse. The echo signal may include reflections and reverberations caused by the casing, the cement layer, and an interface between the two. These reflections and reverberations may be used, in part, to calculate downhole characteristics, including the cement impedance. In some instances, borehole fluids, such as drilling mud, completion fluids, and other formation fluids, may be present within the casing such that the acoustic pulse must be transmitted through the borehole fluid. Traditional methods of evaluating cement bonds ignore borehole fluid propagation effects. However, in some instances, the attenuation of borehole fluids, such as oil-based muds and other formation fluids, may lead to variances and biases in the impedance evaluation.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to evaluating cement bonding in a wellbore.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot/tractor or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"), and wireline. In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly The present disclosure provides methods for determining cement impedance, comprising: generating one or more acoustic signals within a wellbore comprising a borehole fluid, a casing and a cement layer; receiving one or more reflections of the acoustic signals from at least a portion of the wellbore, wherein each of the one or more reflections comprises an initial reflection portion and a resonance portion; modifying at least one of the initial reflection portion and the resonance portion based, at least in part, on an attenuation response of the borehole fluid; and determining an impedance of the cement layer by analyzing at least one of the modified initial reflection portion and the modified resonance portion.

In some embodiments, the present disclosure provides methods for determining cement impedance, comprising: generating one or more acoustic signals within a wellbore comprising a borehole fluid and a cement layer; receiving one or more reflections of the acoustic signals from at least a portion of the wellbore, wherein each of the one or more reflections comprises an initial reflection portion and a resonance portion; modifying at least one of the initial reflection portion and the resonance portion based, at least in part, on an attenuation response of the borehole fluid; computing a ratio of one-norms of the initial reflection portion and the resonance portion; simulating one or more simulated acoustic reflections for one or more cement impedances based, at least in part, on the attenuation response of the borehole fluid, wherein the simulated acoustic reflections have a simulated initial reflection portion and a simulated resonance portion; computing a simulated ratio of one-norms of the simulated initial reflection portion and the simulated resonance portion; and determining an impedance of the cement layer based, at least in part, on a comparison of the ratio of one-norms with the simulated ratio of one-norms.

Figure 1:
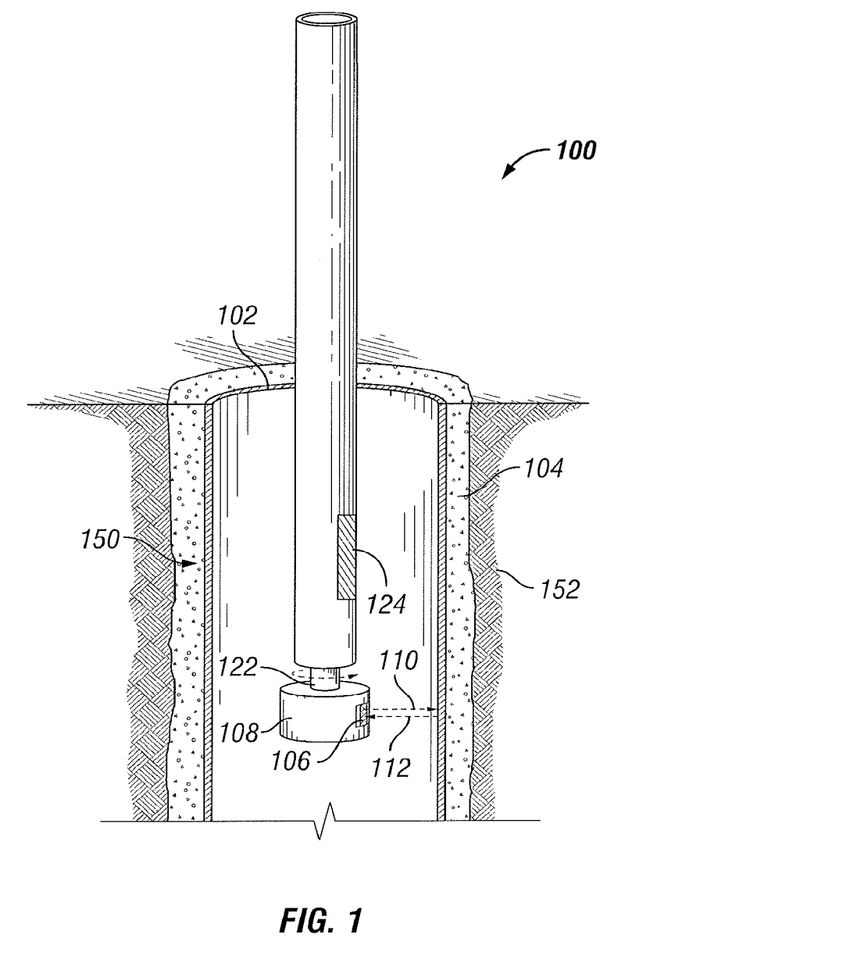
FIG. 1 is a diagram illustrating an example acoustic logging tool, according to aspects of the present disclosure.

FIG. 1 is a diagram illustrating an example acoustic logging tool 100, according to aspects of the present disclosure. The tool 100 may be suspended (e.g., via wireline, slickline, coiled tubing, drill pipe/tubing, downhole tractor, or the like) within a wellbore 150 in a subterranean formation 152. As depicted, the tool 100 may be disposed within a casing 102 that is secured in the wellbore 150 that may comprise a cement layer 104 that substantially fills the annulus between the casing 102 and the wellbore 150. In certain embodiments, the tool 11 may be positioned within a borehole fluid in the wellbore 150. The casing 102 may comprise a metal tubular with a pre-determined length and diameter that is specifically selected for a particular depth in the formation 152. Although only one casing 102 is shown in FIG. 1, multiple casings may be used, including in a telescopic orientation where casings with progressively smaller diameters are used as the wellbore 150 extends further into the formation 152. The casing 102 may prevent the wellbore 150 from collapsing, prevent sensitive formation strata from exposure to downhole fluids, and prevent unwanted formation fluids from entering the wellbore 150. This embodiment is referred to a "cased" hole. The tool may also be positioned within an "open" hole, which may comprise the wellbore 150 without the casing 102 or the cement layer 104.

The tool 100 comprises an elongated tool body 120 comprising a rotating portion 108 with one or more transducers 106 coupled thereto. Example transducers include, but are not limited to, piezoelectric crystals, geophones, electromagnetic elements, etc. As depicted, the rotating portion 108 comprises a rotating head positioned at a distal end of the elongated tool body 120. In other embodiments, the rotation portion 108 may be positioned at one or more intermediate portions of the elongated tool body 120, which may provide greater flexibility with respect to the tool design. As depicted, the diameter of the rotating portion 108 is larger than the diameter of the elongated tool body 120, but other configurations are possible within the scope of the present disclosure.

The rotating portion 108 may be driven by an electric motor (not shown) or another suitable drive mechanism that provides for the controlled rotational movement of the rotating portion 108 with respect to the tool 100. As depicted, the rotating portions 108 may be driven through a shaft 122 connecting the rotating portion 108 to a drive mechanism within the elongated tool body 120. Power for the drive mechanism and other elements within the tool 100 may be provided, for instance, through the means of suspension, or by one or more power sources, e.g., batteries, capacitors, generators, within the tool 100.

In use, the transducer 106 may transmit a directional pulse 110 to the casing 102 at a first azimuthal location. The directional acoustic pulse 110 is not limited with respect to frequency and can but is not required to be an ultrasonic pulse. That pulse 110 may contact, be reflected by, and/or cause to reverberate at least a portion of the wellbore 150. In certain embodiments, the transducer 106 may generate one or more acoustic signals within the wellbore 150 and receive one or more reflections of the acoustic signals from at least a portion of the wellbore 150. In some embodiments, the portion of the wellbore 150 may comprise the casing 102, the cement layer 104, and/or the interface between the casing 102 and the cement layer 104. These reflections and reverberations may comprise an echo signal 112 that is received by the transducer 106. Each of the one or more reflections may comprise an initial reflection portion and a resonance portion.

After the echo signal 112 is received from the first azimuthal location, the rotating portion 108 may be rotated to a second azimuthal location within the wellbore 150. Another pulse may then be transmitted from the transducer 106, and a corresponding echo signal may be received at the transducer 106. The rotating portion 108 then may be rotated to a third azimuthal location within the wellbore 150 and yet another pulse may then be transmitted from the transducer 106, and a corresponding echo signal may be received at the transducer 106. The first, second and third azimuthal locations may but are not required to be equal rotational intervals with respect to the tool 100. For instance, the angular difference between the azimuthal locations may be modified in real time depending on the signals received and the granularity of the resulting measurements, with smaller rotational intervals corresponding to a higher granularity. In certain embodiments, this process may continue until the rotating portion 108 has completed a rotation, at which point the tool 100 may be positioned at a different depth. The group of azimuthal measurements taken at a particular depth may be referred to as a "scan." The number of azimuthal measurements taken to complete a scan may depend, for instance, on the granularity required by the combined measurements as well as downhole conditions. Although not shown, instead of a rotating portion, the whole tool 100 or a portion thereof having the transducer 106 can be rotated to accomplish a similar azimuthal scan. For example, if the tool 100 is conveyed into the wellbore 150 via drill pipe, the drill pipe could be rotated to in-turn rotate the tool 100 and thereby the transducer 106.

In certain embodiments, each echo signal 112 received by the transducer 106 may be transmitted to one or more control systems (not shown) associated with the tool 100, where it can be processed, for example, to determine physical characteristics (e.g., impedance, thickness, slowness, reflectance) of the casing 102 and cement layer 104. As used herein a control system may comprise an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), field programmable gate arrays (FPGA), or any other digital or analog circuitry configured to interpret and/or execute program instructions and/or process data. The one or more control systems associated with the tool 100 could be, for example, wholly within the tool 100, located at the surface, or a combination of the two (e.g., some processing occurring downhole and some done at the surface).

Figure 2:
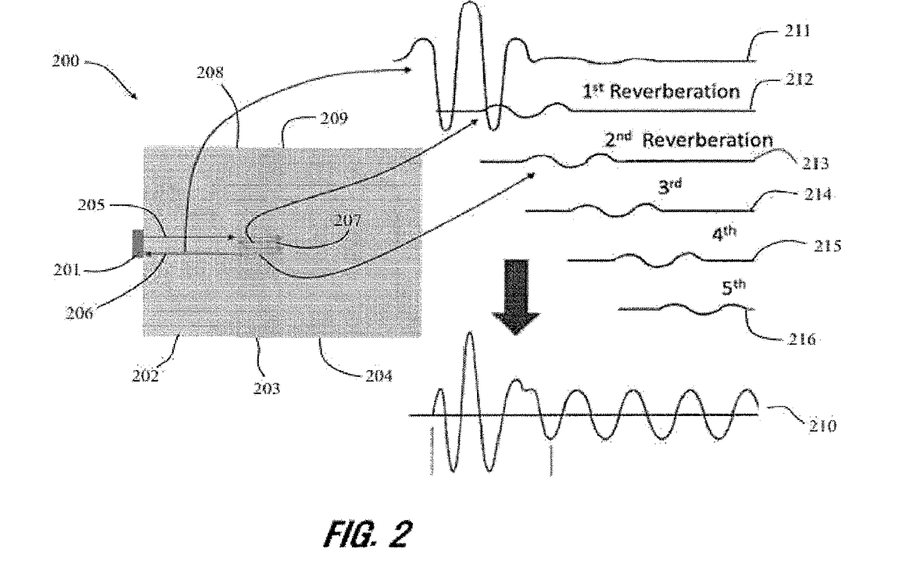
FIG. 2 is a diagram illustrating acoustic signal reflection and resonance in a wellbore according to certain embodiments of the present disclosure.

FIG. 2 is a diagram illustrating acoustic signal reflection and resonance in a wellbore according to certain embodiments of the present disclosure. A three-layer model of wellbore acoustic signal reflection and resonance 200 includes an acoustic transceiver 201, borehole fluid 202, casing 203, and cement layer 204. An acoustic transceiver 201 may be part of a wireline device or other downhole tool. The borehole fluid 202 acts a transmission medium for the outgoing one or more acoustic signals 205 generated by the acoustic receiver 201 within a wellbore. Also shown are the one or more reflections of the acoustic signals 206 and the one or more acoustic signals reverberating within the casing 207. The resonance portion of the acoustic signal 207 is the portion of the outgoing acoustic signal 205 that is not reflected at the borehole fluid-casing interface 208 and enters the casing 203. The resonance portion of the acoustic signal 207 is reflected back and forth between the borehole-fluid-casing interface 208 and the casing-cement interface 209. At each reflection, some energy is transmitted through each interface into the cement layer 204 or the borehole fluid 202. After generating the outgoing acoustic signal 205, the acoustic transceiver 201 receives the reflected acoustic signal 206. Also shown is an example of a reflected acoustic signal waveform 210 of the reflected acoustic signal 206 and the individual waveforms 211-216 that sum to provide the reflected acoustic signal waveform 210. The initial reflection waveform 211 (from the borehole fluid-casing interface 208) combines with the resonance waveforms 212-216.

Figure 3:
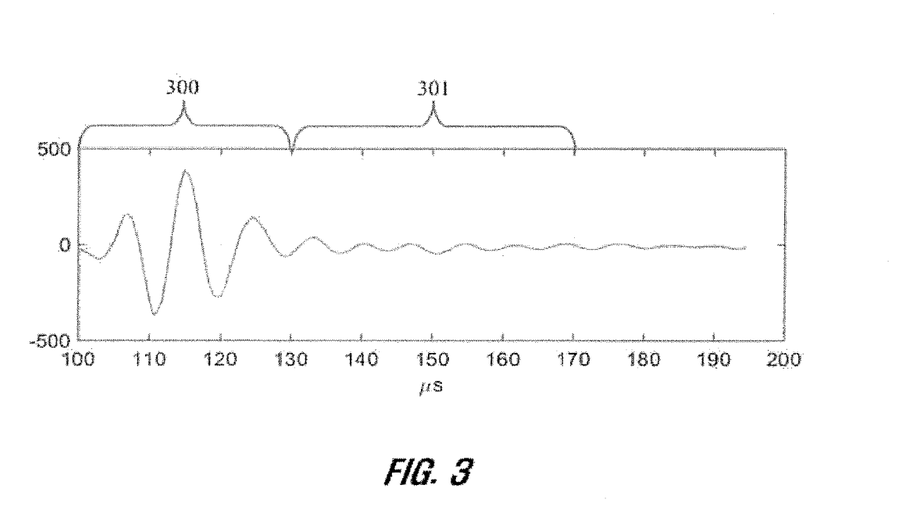
FIG. 3 is a graph illustrating a received acoustic signal according to certain embodiments of the present disclosure.

FIG. 3 is a diagram of a received acoustic signal according to certain embodiments of the present disclosure. The received acoustic signal may comprise one or more reflections of one or more acoustic signals, each of which may include an initial reflection portion and a resonance portion. Shown is the portion corresponding to the initial reflection at the borehole fluid-casing interface 300 and the portion corresponding to the resonance portion 301. The amplitudes of the one or more reflections of acoustic signals are a function of the properties of the different layers in the model 200 as well as their geometry.

In certain embodiments, the three-layer model shown in FIG. 2 may be modeled as a planar 1-D model where a plane wave is assumed to be normally on the interface of the borehole fluid layer. In some embodiments, the model assumes that each layer comprises left- and right-going plane waves with complex coefficients for each wave and properties for each layer (e.g., compression, speed, mass density, thickness, and attenuation response).

In certain embodiments, an attenuation response may be determined for one or more layers in the wellbore, such as the attenuation response of the borehole fluid, casing, or cement layer. In some embodiments, determining the attenuation response of the borehole fluid may include determining a frequency-dependent attenuation model for the borehole fluid. In some embodiments, for example, attenuation may be modeled as loss of energy as a function of distance traveled by a wave and the frequency of operations. The frequency-dependent attenuation model may be a linear model parameterized by two coefficients, a slope and an intercept. For example, in certain embodiments, an attenuation model may be described by Equation (1):

$$\text{Loss in dB} = 20 * \log_{10}(e^{-\alpha x}) \tag{1}$$

where $\alpha$ is the attenuation coefficient and x is the distance traveled by the wave through the medium (e.g., the distance traveled by the one or more acoustic signals through the borehole fluid). In certain embodiments, the attenuation coefficient may be modeled as a linear function of frequency as described by Equation (2):

$$\alpha = \alpha_0 + (\alpha_1 * f) \quad (2)$$

where f is a frequency of the wave (e.g., the one or more acoustic signals), $\alpha_1$ is the slope of the attenuation model and $\alpha_0$ is the intercept of the attenuation model.

Figure 4:
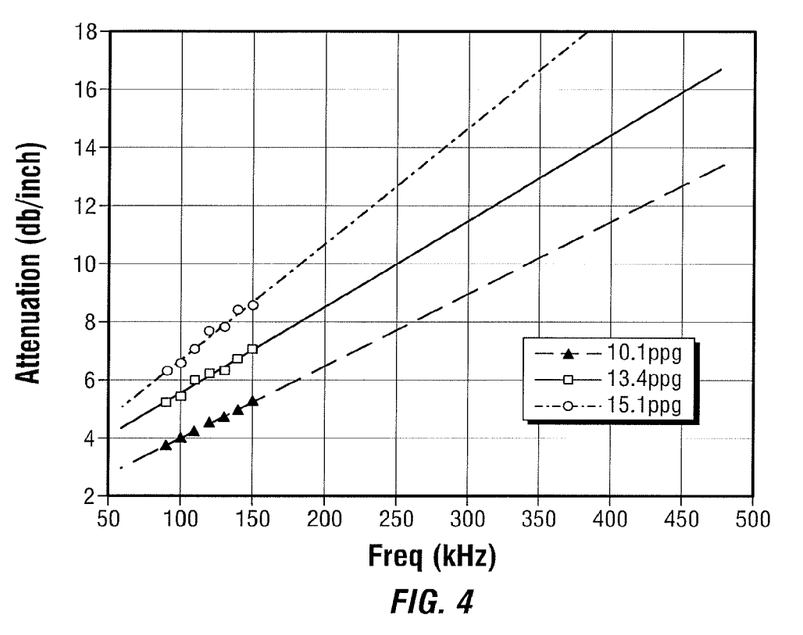
FIG. 4 is a graph illustrating attenuation as a function of frequency for different drilling fluids.

FIG. 4 is a graph of attenuation as a function of frequency for different borehole fluids and shows that they agree well with a linear fit. In certain embodiments, attenuation may be measured at two or more frequencies and a linear model may be fitted to the data to determine attenuation as a function of frequency. In some embodiments, attenuation may be measured using a mud cell within a downhole tool.

In certain embodiments, the attenuation response may be applied with any suitable cement impedance estimation model. In certain embodiments, the input acoustic signal wave for the model is determined based, at least in part, on the initial reflection portion of the reflections of the one or more acoustic signals (300 in FIG. 3). Without accounting for attenuation, the initial reflection portion may comprise from about 75 percent to about 99 percent of the energy generated by the transceiver. In certain embodiments, the initial reflection portion may comprise approximately 93 percent of the energy generated by the transceiver.

In certain embodiments, at least one of the initial reflection portion and the resonance portion may be modified by the attenuation response of the borehole fluid. The impedance of the cement layer may then be determined by analyzing at least one of the initial reflection portion and the modified resonance portion. In some embodiments, for example, the initial reflection portion of one or more reflections of the one or more acoustic signals may be modified by extracting and backwards propagating with the appropriate attenuation of the borehole fluid. In certain embodiments, this modifying may comprise multiplying each frequency component of at least one of the initial reflection portion and the resonance portion by $e^{2\alpha_f df}$, where $\alpha_f$ is the borehole fluid attenuation coefficient, f is the frequency of the frequency component, and d is the standoff distance between the face of the transducer and the wellbore casing.

In some embodiments, the energy in the resonance portion may be suitably normalized by the energy or amplitude of the initial reflection portion. In certain embodiments, the resonance portion may be indicative of cement impedance. In some embodiments, determining a cement impedance may comprise computing the energy of the resonance portion signal for different cement impedances and creating a lookup table (LUT). In some embodiments, for example, once data is acquired, the signal in the resonance portion is normalized and analyzed by segmenting and computing its energy. In certain embodiments, the appropriate cement impedance may be determined using the computed LUT.

Figure 5:
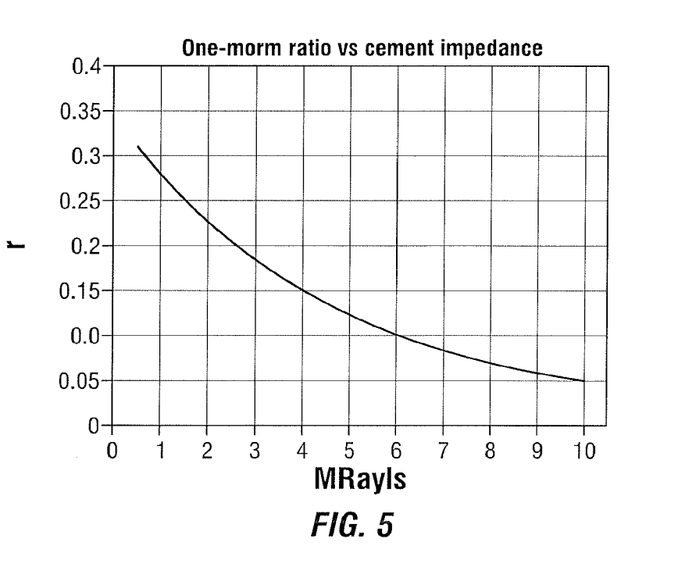
FIG. 5 is a graph illustrating data relating a ratio of one-norms of the initial reflection portion and the resonance portion of a received acoustic signal to cement impedance according to certain embodiments of the present disclosure.

As used herein, a one-norm is the sum of the absolute values of the component signals. In certain embodiments, determining the impedance of the cement layer may include determining the one-norm of the resonance portion of the one or more acoustic signal reflections, suitably normalized by either the peak amplitude of the initial reflection portion or the one-norm of the initial reflection portion. In some embodiments, this ratio may be a ratio of one-norms. A ratio of one-norms of the initial reflection portion and the resonance portion may be represented by Equation (3):

$$r = \frac{(norm_1)_B}{(norm_1)_A} \quad (3)$$

where $(norm_1)_A$ is the one-norm of the initial reflection portion of the reflections of the one or more acoustic signals (300 of FIG. 3) and $(norm_1)_B$ is the one-norm of the resonance portion of the reflections of the one or more acoustic signals (301 of FIG. 3). FIG. 5 is a graph of typical values of the ratio of Equation (3) and the corresponding cement impedance in MRayls for a 15 ppg synthetic oil-based mud.

In certain embodiments, a LUT for the ratio of one-norms may be populated for a finite number of cement impedance values. The LUT for the ratio of one-norms may be populated by simulating one or more acoustic reflections for one or more cement impedances. In some embodiments, one or more simulated acoustic reflections may be simulated for at least two cement impedances. In some embodiments, the one or more simulated acoustic reflections may be based, at least in part, on the attenuation response of the fluid, and may include a simulated initial reflection portion and a simulated resonance portion. In certain embodiments, a simulated ratio of one-norms may be calculated based on the simulated initial reflection portion and the simulated resonance portion of the one or more simulated acoustic reflections. The simulated ratio of one-norms may be represented by Equation (3) where $(norm_1)_A$ is the one-norm of the simulated initial reflection portion and $(norm_1)_B$ is the one-norm of the simulated resonance portion. The LUT may then be used to estimate cement impedance. For example, in certain embodiments, impedance of the cement layer may be determined by comparing the ratio of one-norms determined for the measured data with the simulated ratio of one-norms in the LUT.

In certain embodiments, a ratio of one-norms model may be determined to describe the relationship between the ratio of one-norms and cement impedance. A log transformation of the one-norm ratio of Equation (3) may be linear with respect to cement impedance. Simulating at least two cement impedances may provide a model for the relationship between $\log_{10} r$ and cement impedance as shown in Equation (4):

$$\log_{10} r = pZ_c + q \quad (4)$$

where r is the simulated ratio of one-norms described by Equation (3), p is the slope of the ratio of one-norms model, q is the intercept of the ratio of one-norms model, and $Z_c$ is the cement impedance. In some embodiments, p and q may be determined by fitting Equation (4) to data using least squares fitting.

The inverse relation for the impedance estimate $\widehat{Z_c}$ may be represented by Equation (5):

$$\widehat{Z_c} = \left( \frac{\log_{10} r_{meas} - q}{p} \right) \quad (5)$$

where $r_{meas}$ is the ratio of Equation (3) for each received acoustic signal.

Figure 6:
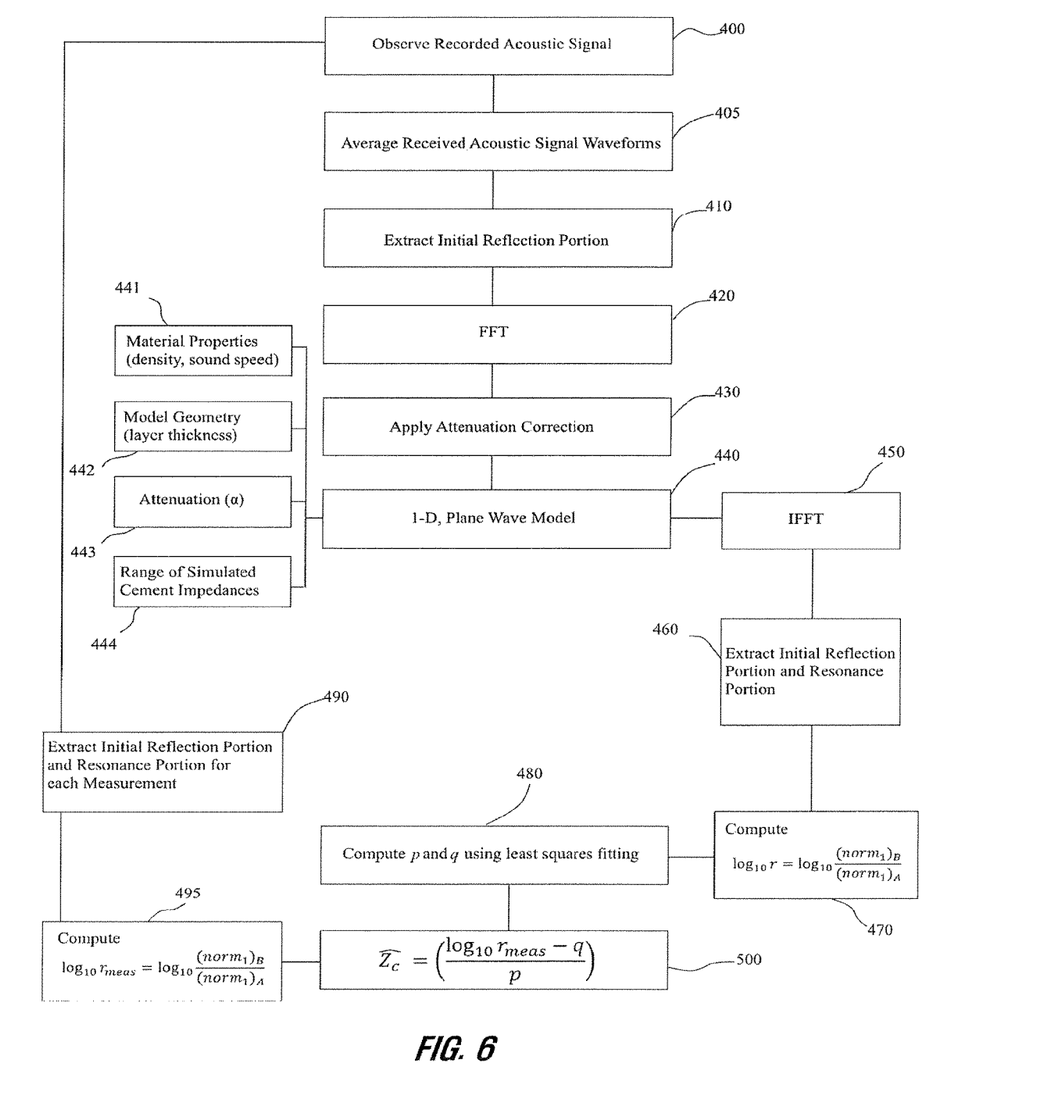
FIG. 6 is a flow diagram of an example cement impedance estimation algorithm according to certain embodiments of the present disclosure.

FIG. 6 is a flow diagram of an example cement impedance estimation algorithm, according to certain embodiments of the present disclosure. At step 400, a measured waveform of a received acoustic signal is observed in the wellbore for processing. At step 405, the received acoustic signal is averaged. At step 410, the initial reflection portion of the received acoustic signal is extracted from the rest of the waveform. At step 420, at least one of the initial reflection portions is transformed by Fast Fourier Transform (FFT) into its frequency domain equivalent. At step 430, the attenuation correction is applied. In some embodiments, the attenuation correction 430 is applied by multiplying each frequency component by $e^{2\alpha_f df}$. At step 440, a frequency domain model is generated using the initial reflection portion corrected for attenuation response 430 and other model inputs such material properties (e.g., density, sound speed) 441, model geometry (e.g., thickness of layers) 442, the attenuation coefficient 443, and at least two simulated cement impedances 444. In some embodiments, the model is a 1-D, planar wave model. In step 450, the model output is transformed by the Inverse Fast Fourier Transform (IFFT) back into the time domain. In step 460, the initial reflection portion and the resonance portion are extracted from the time domain model output. In step 470, the common logarithm of the one-norm ratio (e.g., Equation (3)) is calculated based on the extracted portions. In step 480, p and q of Equation (5) are determined by least square fitting a linear model of Equation (4) to simulated data provided by the model. In step 490, the cement impedance $\widehat{Z_c}$ is calculated for each received acoustic signal according to Equation (5), with the p and q values from step 480. In step 495, the one-norm ratio (e.g., Equation (3)) is calculated for each received acoustic signal. In step 500, the waveform of each received acoustic signal is extracted into the initial reflection portion and the resonance portion.

Figures 7, 8:
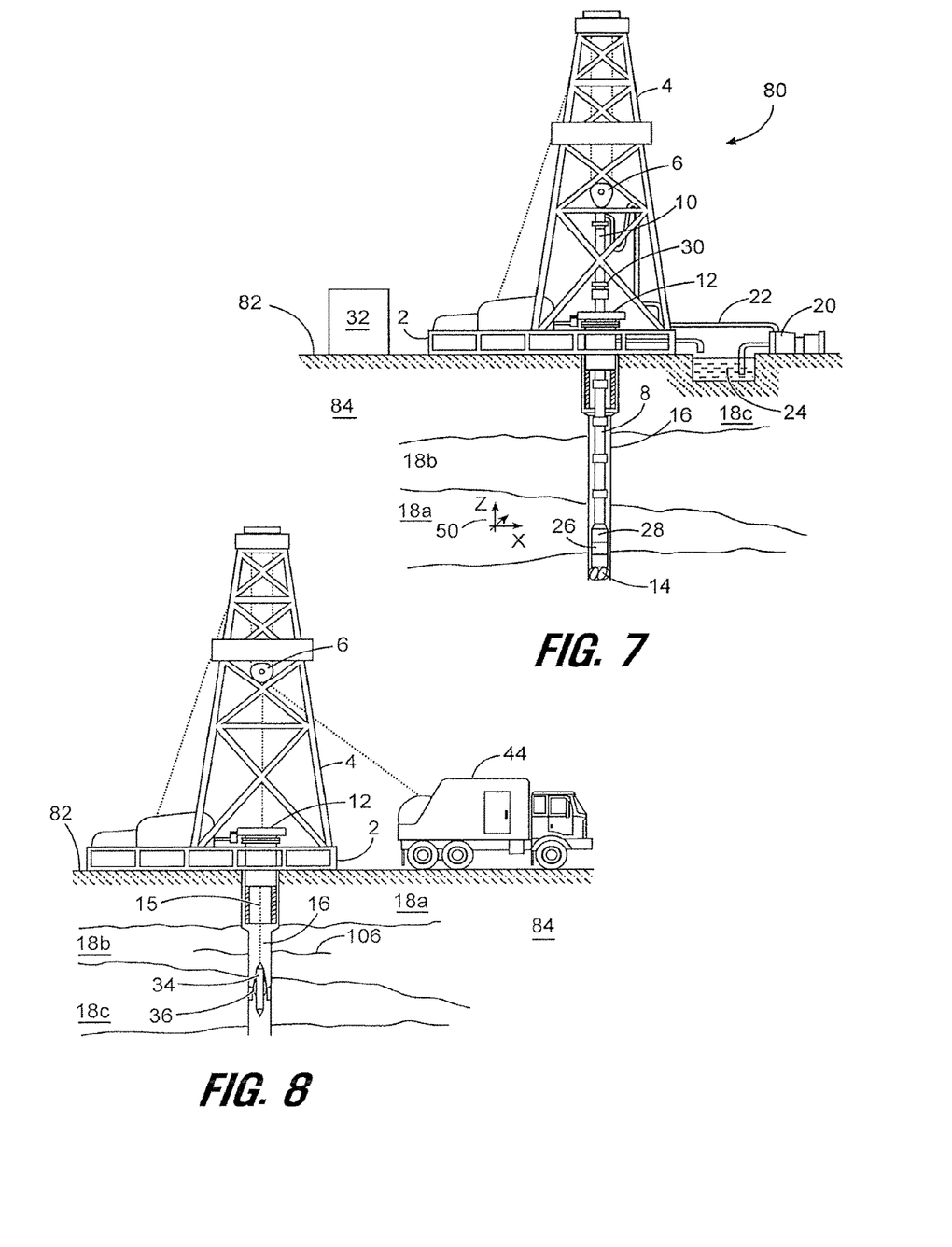
FIG. 7 is a diagram showing an illustrative drilling system, according to aspects of the present disclosure.
FIG. 8 is a diagram showing an illustrative wireline logging system, according to aspects of the present disclosure.

One or more of the apparatus, systems, and/or methods described above may be incorporated into/with a wireline tool/sonde for wireline logging operation or into/with one or more LWD/MWD tools for drilling operations. FIG. 7 is a diagram showing a subterranean drilling system 80 incorporating at least one acoustic LWD/MWD tool 26, according to aspects of the present disclosure. The drilling system 80 comprises a drilling platform 2 positioned at the surface 82. As depicted, the surface 82 comprises the top of a formation 84 containing one or more rock strata or layers 18*a-c*, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a wellbore 16 that passes through one or more rock strata or layers 18*a-c*. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the wellbore 16 into the pit 24 and aids in maintaining integrity or the wellbore 16.

The drilling system 80 may comprise a bottom hole assembly (BHA) coupled to the drill string 8 near the drill bit 14. The BHA may comprise various downhole measurement tools and sensors and LWD and MWD elements, including the acoustic tool 26. In one or more embodiments, the tool 26 may comprise acoustic pulse excitation and echo/reflection reception functionality that will be described in detail below. As the bit extends the wellbore 16 through the formations 18*a-c*, the tool 26 may collect measurements relating to wellbore 16 and the formation 84. In certain embodiments, the orientation and position of the acoustic tool 26 may be tracked using, for example, an azimuthal orientation indicator, which may include magnetometers, inclinometers, and/or accelerometers, though other sensor types such as gyroscopes may be used in some embodiments.

In certain embodiments, signals received by the acoustic tool 26 may be transmitted to one or more processors or information handling systems (not shown) associated with the tool 26, where they can be processed, for example, to determining physical characteristics of the wellbore 16. The one or more processors associated with the tool 26 could be, for example, wholly within the tool 26, located at the surface, or a combination of the two (e.g., some processing occurring downhole and some done at the surface).

The tools and sensors of the BHA including the tool 26 may be communicably coupled to a telemetry element 28. The telemetry element 28 may transfer measurements from acoustic tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 82. The surface control unit 32 may comprise an information handling system communicably coupled to the surface receiver 30 and may receive measurements from the acoustic tool 26 and/or transmit commands to the acoustic tool 26 though the surface receiver 30. The surface control unit 32 may also receive measurements from the acoustic tool 26 when the acoustic tool 26 is retrieved at the surface 82. As is described above, the surface control unit 32 may process some or all of the measurements from the acoustic tool 26 to determine certain parameters of downhole elements, including the wellbore 16 and formation 84.

At various times during the drilling process, the drill string 8 may be removed from the wellbore 16 as shown in FIG. 8. Once the drill string 8 has been removed, measurement/logging operations can be conducted using a wireline tool 34, e.g., an instrument that is suspended into the wellbore 16 by a cable 15 having conductors for transporting power to the tool and telemetry from the tool body to the surface 82. The wireline tool 34 may comprise an acoustic tool 36, similar to the acoustic tool 26 described above. The acoustic tool 36 may be communicatively coupled to the cable 15. A logging facility 44 (shown in FIG. 8 as a truck, although it may be any other structure) may collect measurements from the acoustic tool 36, and may include computing facilities (including, e.g., a control unit/information handling system) for controlling, processing, storing, and/or visualizing some or all of the measurements gathered by the tool 36. The computing facilities may be communicatively coupled to the acoustic tool 36 by way of the cable 15. In certain embodiments, the control unit 32 may serve as the computing facilities of the logging facility 44.

An example method for determining cement impedance includes generating one or more acoustic signals within a wellbore comprising a borehole fluid, a casing, and a cement layer. One or more reflections of the acoustic signals may be received from at least a portion of the wellbore, wherein each of the one or more reflections comprises an initial reflection portion and a resonance portion. At least one of the initial reflection portion and the resonance portion may be modified based, at least in part, on an attenuation response of the borehole fluid. An impedance of the cement layer may be determined by analyzing at least one of the modified initial reflection portion and the modified resonance portion.

In one or more embodiments described in the preceding paragraph, the method may further comprise determining the attenuation response of the borehole fluid.

In one or more embodiments described in the preceding two paragraphs, determining the attenuation response of the borehole fluid comprises determining a frequency-dependent attenuation model for the borehole fluid.

In one or more embodiments described in the preceding three paragraphs, determining the frequency-dependent attenuation model comprises using the following equation:

$$\text{Loss in dB} = 20 * \log_{10}(e^{-\alpha x})$$

wherein $\alpha$ corresponds to an attenuation coefficient and x corresponds to a distance traveled by the one or more acoustic signals through the borehole fluid.

In one or more embodiments described in the preceding four paragraphs, determining the frequency-dependent attenuation model further comprises using the following linear equation:

$$\alpha = \alpha_0 + (\alpha_1 * f)$$

wherein f corresponds to a frequency of the acoustic signal, $\alpha_1$ corresponds to a slope of the attenuation model, and $\alpha_0$ corresponds to an intercept of the attenuation model.

In one or more embodiments described in the preceding five paragraphs, the modifying comprises multiplying each frequency component of at least one of the initial reflection portion and the resonance portion by $e^{2\alpha_f d f}$, where $\alpha_f$ corresponds to a borehole fluid attenuation coefficient, f corresponds to a frequency of the frequency component, and d corresponds to a standoff distance between the transducer and a wellbore casing.

In one or more embodiments described in the preceding six paragraphs, the one or more acoustic signals are generated by an acoustic logging tool comprising a transducer positioned within the borehole fluid.

In one or more embodiments described in the preceding seven paragraphs, the acoustic logging tool comprises a rotating portion to which the transducer is coupled.

In one or more embodiments described in the preceding eight paragraphs, the method further comprises transforming at least one of the initial reflection portions into a frequency domain by performing a Fast Fourier transform.

In one or more embodiments described in the preceding nine paragraphs, determining an impedance of the cement layer comprises determining a one-norm of the resonance portion normalized by a peak amplitude in the initial reflection portion or a one-norm of the initial reflection portion.

In one or more embodiments described in the preceding ten paragraphs, determining an impedance of the cement layer comprises determining a ratio of one-norms using the following equation:

$$r = \frac{(norm_1)_B}{(norm_1)_A}$$

wherein $(norm_1)_A$ corresponds to a one-norm of the initial reflection portion and $(norm_1)_B$ corresponds to a one-norm of the resonance portion.

In one or more embodiments described in the preceding eleven paragraphs, the method further comprises determining a ratio of one-norms model to describe a relationship between the ratio of one-norms and cement impedance.

In one or more embodiments described in the preceding twelve paragraphs, wherein determining the ratio of one-norms model comprises using the following equation:

$$\log_{10} r = p Z_c + q$$

wherein r corresponds to the ratio of one-norms, p corresponds to a slope of the ratio of one-norms model, q corresponds to an intercept of the ratio of one-norms model, and $Z_c$ corresponds to the cement impedance; and wherein p and q are determined using least squares fitting.

In one or more embodiments described in the preceding thirteen paragraphs, determining the ratio of one-norms model comprises simulating one or more acoustic reflections for at least two cement impedances.

In one or more embodiments described in the preceding fourteen paragraphs, determining the cement impedance comprises using the following equation:

$$\tilde{Z}_c = \left( \frac{\log_{10} r_{meas} - q}{p} \right)$$

wherein $r_{meas}$ corresponds to the ratio of one-norms for each reflection of the one or more acoustic signals.

An example method for determining cement impedance may include generating one or more acoustic signals within a wellbore comprising a borehole fluid, a casing and a cement layer. One or more reflections of the acoustic signals may be received from at least a portion of the wellbore, wherein each of the one or more reflections comprise an initial reflection portion and a resonance portion. At least one of the initial reflection portion and the resonance portion may be modified based, at least in part, on an attenuation response of the borehole fluid. A ratio of one-norms of the initial reflection portion and the resonance portion may be computed. One or more simulated acoustic reflections for one or more cement impedances may be simulated based, at least in part, on the attenuation response of the borehole fluid, wherein each of the one or more simulated acoustic reflections have a simulated initial reflection portion and a simulated resonance portion. A simulated ratio of one-norms of the simulated initial reflection portion and the simulated resonance portion may be computed. An impedance of the cement layer may be determined based, at least in part, on a comparison of the ratio of one-norms with the simulated ratio of one-norms.

In one or more embodiments described in the preceding paragraph, computing a ratio of one-norms of the initial reflection portion and the resonance portion comprises using the following equation:

$$r = \frac{(norm_1)_B}{(norm_1)_A}$$

wherein $(norm_1)_A$ corresponds to a one-norm of the initial reflection portion and $(norm_1)_B$ corresponds to a one-norm of the resonance portion.

In one or more embodiments described in the preceding two paragraphs, computing the simulated ratio of one-norms comprises using the following equation:

$$r = \frac{(norm_1)_B}{(norm_1)_A}$$

wherein $(norm_1)_A$ corresponds to a one-norm of the simulated initial reflection portion and $(norm_1)_B$ corresponds to a one-norm of the simulated resonance portion.

In one or more embodiments described in the preceding three paragraphs, the one or more acoustic signals are generated by an acoustic logging tool comprising a transducer positioned within the borehole fluid.

In one or more embodiments described in the preceding four paragraphs, the acoustic logging tool comprises a rotating portion to which the transducer is coupled.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for determining cement impedance, comprising:
   generating one or more acoustic signals within a wellbore comprising a borehole fluid, a casing, and a cement layer;
   receiving one or more reflections of the acoustic signals from at least a portion of the wellbore, wherein each of the one or more reflections comprises an initial reflection portion and a resonance portion;
   modifying at least one of the initial reflection portion and the resonance portion based, at least in part, on an attenuation response of the borehole fluid; and
   determining an impedance of the cement layer by analyzing at least one of the modified initial reflection portion and the modified resonance portion.

2. The method of claim 1, further comprising determining the attenuation response of the borehole fluid.

3. The method of claim 2, wherein determining the attenuation response of the borehole fluid comprises determining a frequency-dependent attenuation model for the borehole fluid.

4. The method of claim 3, wherein determining the frequency-dependent attenuation model comprises using the following equation:

$$\text{Loss in dB} = 20 * \log_{10}(e^{-\alpha x})$$

wherein $\alpha$ corresponds to an attenuation coefficient and $x$ corresponds to a distance traveled by the one or more acoustic signals through the borehole fluid.

5. The method of claim 4, wherein determining the frequency-dependent attenuation model further comprises using the following linear equation:

$$\alpha = \alpha_0 + (\alpha_1 * f)$$

wherein $f$ corresponds to a frequency of the acoustic signal, $\alpha_1$ corresponds to a slope of the attenuation model, and $\alpha_0$ corresponds to an intercept of the attenuation model.

6. The method of claim 1, wherein the modifying comprises multiplying each frequency component of at least one of the initial reflection portion and the resonance portion by $e^{2\alpha_f d f}$, where $\alpha_f$ corresponds to a borehole fluid attenuation coefficient, $f$ corresponds to a frequency of the frequency component, and $d$ corresponds to a standoff distance between the transducer and a wellbore casing.

7. The method of claim 1, wherein the one or more acoustic signals are generated by an acoustic logging tool comprising a transducer positioned within the borehole fluid.

8. The method of claim 7, wherein the acoustic logging tool comprises a rotating portion to which the transducer is coupled.

9. The method of claim 1, further comprising transforming at least one of the initial reflection portions into a frequency domain by performing a Fast Fourier transform.

10. The method of claim 1, wherein determining an impedance of the cement layer comprises determining a one-norm of the resonance portion normalized by a peak amplitude in the initial reflection portion or a one-norm of the initial reflection portion.

11. The method of claim 1, wherein determining an impedance of the cement layer comprises determining a ratio of one-norms using the following equation:

$$r = \frac{(norm_1)_B}{(norm_1)_A}$$

wherein $(norm_1)_A$ corresponds to a one-norm of the initial reflection portion and $(norm_1)_B$ corresponds to a one-norm of the resonance portion.

12. The method of claim 11, further comprising determining a ratio of one-norms model to describe a relationship between the ratio of one-norms and cement impedance.

13. The method of claim 12, wherein determining the ratio of one-norms model comprises using the following equation:

$$\log_{10} r = p Z_c + q$$

wherein $r$ corresponds to the ratio of one-norms, $p$ corresponds to a slope of the ratio of one-norms model, $q$ corresponds to an intercept of the ratio of one-norms model, and $z_c$ corresponds to the cement impedance; and wherein $p$ and $q$ are determined using least squares fitting.

14. The method of claim 11, wherein determining the ratio of one-norms model comprises simulating one or more acoustic reflections for at least two cement impedances.

15. The method of claim 13, wherein determining the cement impedance comprises using the following equation:

$$\tilde{Z}_c = \left( \frac{\log_{10} r_{meas} - q}{p} \right)$$

wherein $r_{meas}$ corresponds to the ratio of one-norms for each reflection of the one or more acoustic signals.

16. A method for determining cement impedance, comprising:

generating one or more acoustic signals within a wellbore comprising a borehole fluid, a casing and a cement layer;

receiving one or more reflections of the acoustic signals from at least a portion of the wellbore, wherein each of the one or more reflections comprise an initial reflection portion and a resonance portion;

modifying at least one of the initial reflection portion and the resonance portion based, at least in part, on an attenuation response of the borehole fluid;

computing a ratio of one-norms of the initial reflection portion and the resonance portion;

simulating one or more simulated acoustic reflections for one or more cement impedances based, at least in part, on the attenuation response of the borehole fluid, wherein each of the one or more simulated acoustic reflections have a simulated initial reflection portion and a simulated resonance portion;

computing a simulated ratio of one-norms of the simulated initial reflection portion and the simulated resonance portion; and determining an impedance of the cement layer based, at least in part, on a comparison of the ratio of one-norms with the simulated ratio of one-norms.

17. The method of claim 16, wherein computing a ratio of one-norms of the initial reflection portion and the resonance portion comprises using the following equation:

$$r = \frac{(norm_1)_B}{(norm_1)_A}$$

wherein $(norm_1)_A$ corresponds to a one-norm of the initial reflection portion and $(norm_1)_B$ corresponds to a one-norm of the resonance portion.

18. The method of claim 16, wherein computing the simulated ratio of one-norms comprises using the following equation:

$$r = \frac{(norm_1)_B}{(norm_1)_A}$$

wherein $(norm_1)_A$ corresponds to a one-norm of the stimulated initial reflection portion and $(norm_1)_B$ corresponds to a one-norm of the stimulated resonance portion.

19. The method of claim 16, wherein the one or more acoustic signals are generated by an acoustic logging tool comprising a transducer positioned within the borehole fluid.

20. The method of claim 19, wherein the acoustic logging tool comprises a rotating portion to which the transducer is coupled.

* * * * *